(No Model.)
R. UPDIKE.
PLOW ATTACHMENT.
No. 252,820. Patented Jan. 24, 1882.
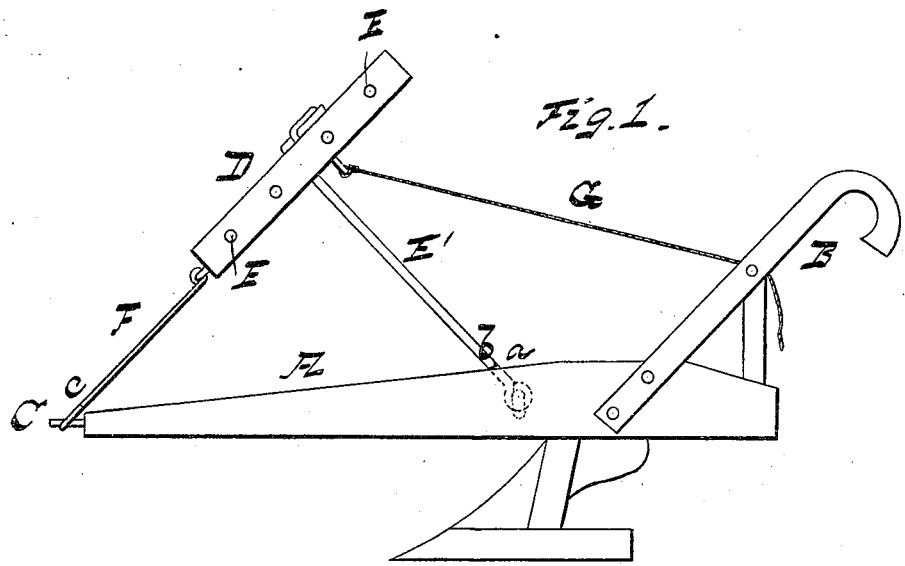
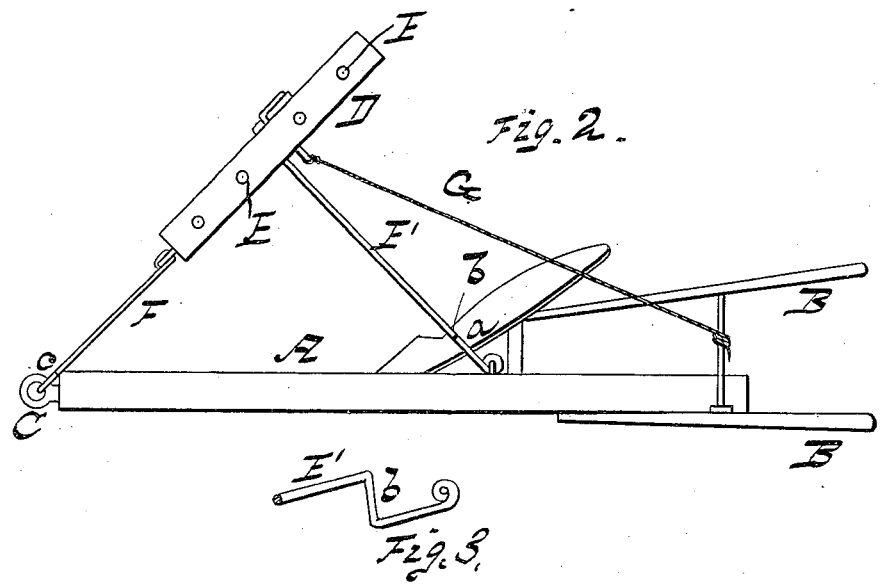
WITNESSES
E. F. Bates
James J. Sheehy
INVENTOR
R. Updike
by Anderson Smith
his ATTORNEYS

UNITED STATES PATENT OFFICE.

RENSELAER UPDIKE, OF HECTOR, NEW YORK.

PLOW ATTACHMENT.

SPECIFICATION forming part of Letters Patent No. 252,820, dated January 24, 1882.

Application filed May 28, 1881. (No model.)

*To all whom it may concern:*

Be it known that I, RENSELAER UPDIKE, a citizen of the United States, résident at Hector, in the county of Schuyler and State of New York, have invented a new and valuable Improvement in Plow Attachments; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation, showing the harrow in a vertical position. Fig. 2 is a plan view. Fig. 3 is a detail view.

This invention has relation to harrow attachments for plows; and it consists in the construction and novel arrangement of the harrow-bar, its angularly-bent arm, connected to the beam or handle in rear by an eyebolt or other hinge-connection, its pivoted or hinged connecting-rod, extending to the clevis or other bearing at the front of the beam and the raising-cord, all as hereinafter shown and described.

In the accompanying drawings, the letter A designates the beam of a plow, B B the handles, and C the clevis at the front end of the beam.

D indicates the harrow-bar, having the teeth E. Its forward end is designed to be located about even with the point of the plow, whence it extends outward obliquely to the rear, as shown in the drawings. It is provided with an arm, E', designed to be firmly and rigidly secured to the harrow-bar and to extend upward obliquely to the plow beam or handle, to which it is connected by means of a loop and eyebolt, or by some other pivotal connections, whereby it will have a free swinging movement at this end.

The arm E' is provided near its pivotal connection $a$ with an angular bend or bearing, $b$, which is designed, when the harrow-bar is raised upward over the plow-beam, to rest on the latter and support the harrow attachment when not in use.

F indicates the forward connecting-rod of the harrow attachment. This rod is connected by eyebolts and loops or other pivotal devices $c$ at its forward end to the clevis or front end of the beam A, and at its rear end to that end of the harrow-bar which is next the plow.

G represents the operating-cord, which is attached to the harrow-bar and extends back to the handle, within easy reach of the plowman.

The pivotal connection $a$ of the arm E' with the plow-beam is designed to be located below the line of direction of the cord, so that when the latter is pulled the attachment will be raised. This facilitates its passage over obstructions, as it can be readily lifted at a moment's notice during the progress of the plow. The attachment can also be lifted into vertical position over the plow-beam, and will then rest thereon by the bearing $b$ of the arm E'. It can be secured in this raised position by drawing the operating cord tight and tying it to the handle of the plow. This attachment is designed to have such a position that it will be constantly before the eye of the plowman. It is free from all liability to interfere with the plow or the horses, and its draft is not perceptible. It is held by the connecting-rod and the arm well off from the line of work of the plow, and is not designed in its operation to touch or disturb the last furrow-slice, but is intended to act on one or two of the slices preceding. In this manner it is designed to avoid tumbling dirt, stones, or trash into the furrow-ditch. The angle which the harrow forms with the line of work of the plow is such that the harrow pushes the dirt, stones, &c., away from the furrow-ditch, and levels down the upturned slices, which may not have been perfectly turned by the plow, and has an effective pulverizing action.

Usually it is designed to use open hooks or detachable connections for the arm and connecting-rod, so that the harrow attachment can be taken off when it is desired to use the plow without the harrow attachment.

Having described this invention, what I claim, and desire to secure by Letters Patent, is—

The harrow attachment to a plow, consisting of the bar D, placed in V form with the beam, the forward connecting-rod, F, the rigid arm E, hinged to the beam and having the shoulder or bearing b, and the cord G, whereby the harrow can be turned up and rest upon the plow-beam, substantially as specified.

In testimony that I claim the above I have hereunto subscribed my name in the presence of two witnesses.

RENSELAER UPDIKE.

Witnesses:
 JACOB J. SCYBOLT,
 JOHN N. SACKETT.